United States Patent
Jang et al.

(10) Patent No.: US 8,408,710 B2
(45) Date of Patent: Apr. 2, 2013

(54) PRESENTATION RECORDING APPARATUS AND METHOD

(75) Inventors: Jong-hyuk Jang, Gunpo-si (KR); Seung-kwon Park, Yongin-si (KR); Hee-seob Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 12/696,868

(22) Filed: Jan. 29, 2010

(65) Prior Publication Data
US 2011/0122326 A1    May 26, 2011

(30) Foreign Application Priority Data
Nov. 26, 2009  (KR) .................. 10-2009-0115233

(51) Int. Cl.
| G03B 21/26 | (2006.01) |
| G09G 3/22 | (2006.01) |
| G09G 5/00 | (2006.01) |
| G06F 3/033 | (2006.01) |
| H04N 9/76 | (2006.01) |

(52) U.S. Cl. ............ 353/30; 353/42; 345/183; 345/157; 345/636; 348/601

(58) Field of Classification Search ............... 353/30, 353/42; 345/158, 183, 156, 157, 636, 175; 715/863; 348/601; 362/257
See application file for complete search history.

(56) References Cited

U.S. PATENT DOCUMENTS

| 6,323,839 B1* | 11/2001 | Fukuda et al. ............... 345/157 |
| 2001/0045940 A1* | 11/2001 | Hansen ........................ 345/158 |
| 2004/0027328 A1* | 2/2004 | Yang ............................ 345/156 |
| 2008/0079693 A1* | 4/2008 | Okamoto et al. ............ 345/157 |
| 2009/0021480 A1 | 1/2009 | Tagawa |
| 2009/0091532 A1 | 4/2009 | Hockett |

FOREIGN PATENT DOCUMENTS

| GB | 2377607 A | 1/2003 |
| JP | 2001-022519 A | 1/2001 |
| JP | 2005-234368 A | 9/2005 |
| JP | 2008-015560 A | 1/2008 |
| JP | 2008-027080 A | 2/2008 |
| KR | 10-2005-0047314 A | 5/2005 |

OTHER PUBLICATIONS

Communication (European Search Report) dated Jun. 30, 2010, issued in the corresponding European Patent Application No. 10157935.6.

* cited by examiner

Primary Examiner — Georgia Y Epps
Assistant Examiner — Magda Cruz
(74) Attorney, Agent, or Firm — Sughrue Mion, PLLC

(57) ABSTRACT

Provided are an apparatus and method thereof for recording a presentation. The presentation recording apparatus includes: a projector operable to project an original image of a presentation onto a screen; a camera operable to capture the image of the presentation projected onto the screen and a light of a pointing device which is irradiated onto the screen; a memory; and a controller, wherein if the projector projects the image of the presentation onto the screen, the controller controls the camera to capture the image of the presentation projected onto the screen, determines coordinate information corresponding to a position of the light of the pointing device irradiated onto the screen, and controls the memory to store the original image of the presentation together with the determined coordinate information.

17 Claims, 9 Drawing Sheets

PRESENTATION RECORDING APPARATUS AND METHOD

CROSS-REFERENCE TO RELATED APPLICATION

This application claims priority from Korean Patent Application No. 10-2009-0115233, filed on Nov. 26, 2009, in the Korean Intellectual Property Office, the disclosure of which is incorporated herein by reference.

BACKGROUND OF THE INVENTION

1. Field of the Invention

Apparatuses and methods consistent with the present invention relate to a presentation system, and more particularly, a projector presentation system.

2. Description of the Related Art

With the recent advances in projector systems, it has become possible to incorporate a camera and a microphone within a projector so as to facilitate capturing an image and an audible signal accompanying a presentation which is simultaneously being projected by the projector. As a result, a user's projection of the presentation images, as well as the user's voice (or other audible sounds) may be captured during the presenting of the presentation, and stored for later use.

Additionally, the user may use a pointing device so as to assist her explanation of the presentation material. In such cases, it would be desirable to capture not only the projected presentation and audio signal, but also any light or images generated by the user's pointing device so as to maximize the quality of a recording of the presentation.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention is to provide an apparatus and method in which an image projected by a projector and an audio input through a microphone are stored in the projector, and a position pointed by a laser pointer is recognized and stored on the basis of an image input through a camera, so that matters pointed by a presenter using the later pointer can be recorded and then played in sync with the stored image and audio.

An exemplary embodiment of the present invention provides a presentation recording apparatus including: a projector operable to project an original image of a presentation onto a screen; a camera operable to capture the image of the presentation projected onto the screen and a light of a pointing device which is irradiated onto the screen; a memory; and a controller, wherein if the projector projects the image of the presentation onto the screen, the controller may control the camera to capture the image of the presentation projected onto the screen, determines coordinate information corresponding to a position of the light of the pointing device irradiated onto the screen, and may control the memory to store the original image of the presentation together with the determined coordinate information.

According to an exemplary embodiment of the present invention, the pointing device may be a laser pointer.

According to an exemplary embodiment of the present invention, the original image of the presentation and the determined coordinate information may be stored together in the memory in a multimedia file.

According to an exemplary embodiment of the present invention, the presentation recording apparatus may further include an audio recorder which is operable to capture an audio signal received during the projecting of the image of the presentation onto the screen, wherein if the projector projects the image of the presentation onto the screen, the controller may further control the audio recorder to capture the audio signal and controls the memory to save the captured audio signal together with the captured image of the presentation and the determined coordinate information.

According to an exemplary embodiment of the present invention, the determining of the coordinate information may include determining horizontal and vertical coordinates of the light of the pointing device irradiated onto the screen.

According to an exemplary embodiment of the present invention, the determining of the coordinate information may include comparing pixels of the captured image with pixels of the image of the presentation.

According to an exemplary embodiment of the present invention, the determining of the coordinate information may include determining whether a pixel of the captured image is greater than a predetermined threshold value.

According to an exemplary embodiment of the present invention, the audio signal may be a voice of a speaker speaking during the presentation.

According to an exemplary embodiment of the present invention, the controller may further analyze an accumulation of information corresponding to coordinate information for a plurality of positions of the light of the pointing device which is irradiated onto the screen, and determines if the plurality of positions of the light of the pointing device correspond to a shape, and if the plurality of positions of the light of the pointing device correspond to the shape, the controller may further control the memory to store shape information corresponding to the shape to be stored together with the original image of the presentation and the determined coordinate information.

According to an exemplary embodiment of the present invention, the determining of the coordinate information may include comparing pixels of the captured image with pixels of an original image of the presentation which is received by the apparatus.

Another exemplary embodiment of the present invention provides a method for recording a presentation, the method may include: projecting an original image of a presentation onto a screen; capturing the image of the presentation projected onto the screen; capturing a light of a pointing device which is irradiated onto the screen; determining coordinate information corresponding to a position of the light of the pointing device irradiated onto the screen; and storing the original image of the presentation together with the determined coordinate information.

According to an exemplary embodiment of the present invention, the storing of the original image of the presentation together with the determined coordinate information may include storing the original image of the presentation together with the determined coordinate information together in a multimedia file.

According to an exemplary embodiment of the present invention, the method may further include capturing an audio signal and saving the captured audio signal together with the captured image of the presentation and the determined coordinate information.

According to an exemplary embodiment of the present invention, the determining of the coordinate information may include determining horizontal and vertical coordinates of the light of the pointing device irradiated onto the screen.

According to an exemplary embodiment of the present invention, the determining of the horizontal and vertical coordinates may include comparing pixels of the captured image with pixels of the image of the presentation.

According to an exemplary embodiment of the present invention, the determining of the coordinate information may include determining whether a pixel of the captured image has a luminance greater than a predetermined threshold value.

According to an exemplary embodiment of the present invention, the method may further include: analyzing an accumulation of information corresponding to coordinate information for a plurality of positions of the light of the pointing device which is irradiated onto the screen; determining whether the plurality of positions of the light of the pointing device correspond to a shape; and if the plurality of positions of the light of the pointing device correspond to the shape, the method further comprises storing shape information corresponding to the shape to be stored together with the original image of the presentation and the determined coordinate information.

According to an exemplary embodiment of the present invention, the determining of the coordinate information may include comparing pixels of the captured image with pixels of an original image of the presentation which is received by the apparatus.

According to an exemplary embodiment of the present invention, the method may further include receiving the presentation from an external input.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

As used herein, the term "pixel" should be understood to include a single pixel, and also the possibility of a plurality of pixels, however, the singular term "pixel" will be used hereinafter for simplicity. Further, the terms "pixel" and "spot" are used interchangeably herein. Thus, one of skill in the art would understand that a "spot," as used herein, can mean a singular spot or pixel, or a plurality of spots or pixels.

Figure 1:
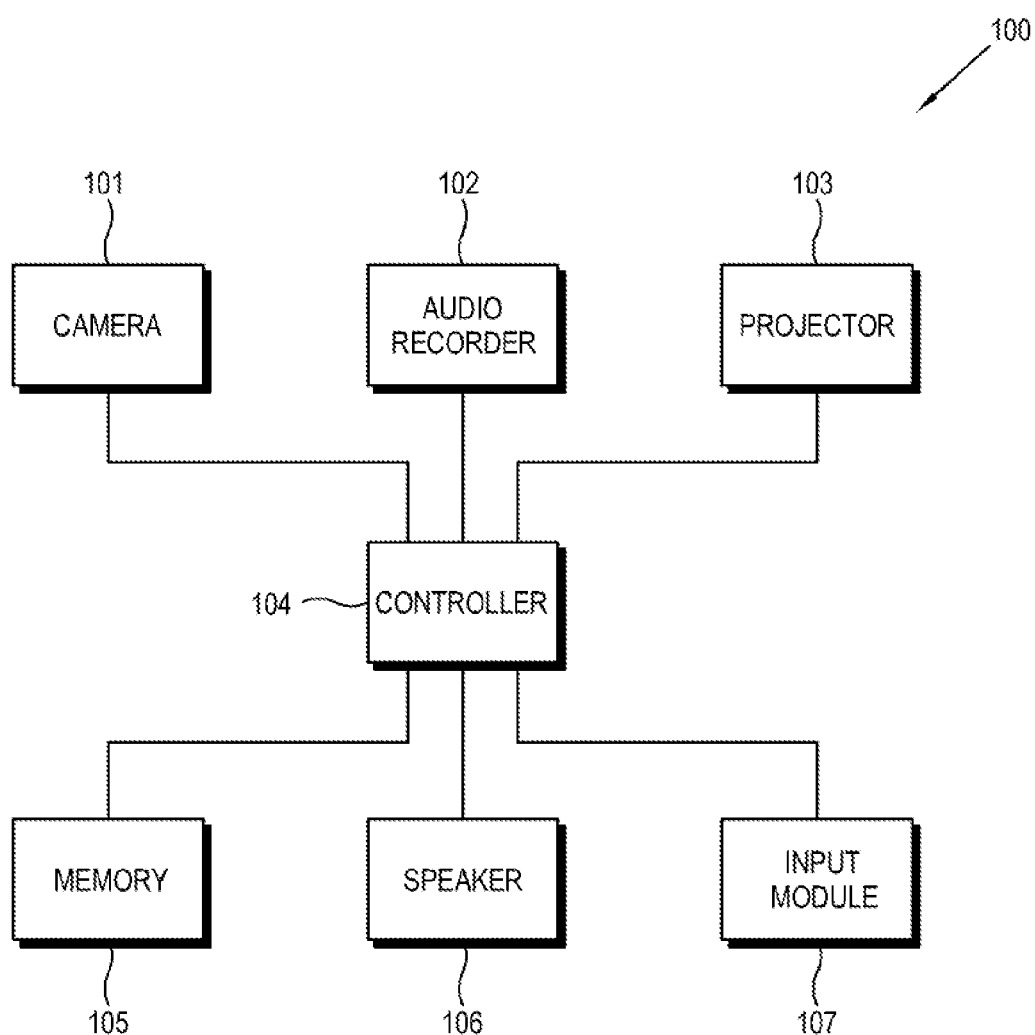
FIG. 1 illustrates an example of an apparatus according to an exemplary embodiment of the present invention.

A presentation recording apparatus according to an exemplary embodiment of the present invention is shown in FIG. 1. As shown in the figure, the presentation recording apparatus 100 may include a camera 101, an audio recorder 102, a projector 103, a controller 104, a memory 105, a speaker 106 and an input module 107.

According to an exemplary embodiment of the present invention, the projector 103 projects an original image of a presentation onto a screen (not shown). The presentation may include both images and audio; either/both may be received via an input module 107; likewise, either/both may be stored in an internal memory (e.g., memory 105). A user can then use a pointing device such as a laser pointer (not shown) to irradiate a light onto the screen. The camera 101 can then capture the projected image and the irradiated light of the pointer, both of which are simultaneously visible on the screen. The original image, i.e., the image of the presentation, and the irradiated light of the pointer can be stored in the memory 105.

When the light of the pointer is irradiated onto the screen, the pixel or pixels upon which the light is irradiated will have an increased luminance. For example, the light of a laser pointer will typically show up as a bright spot on the screen. The irradiated spot will typically be brighter (as viewed by a user viewing the screen) than the pixel of the image of the presentation upon which the laser is irradiated. That is, a luminance of a pixel corresponding to the irradiated spot will tend to be brighter than a luminance of a corresponding pixel of the image of the presentation.

Once the projected image is captured along with the irradiated light of the pointer, the controller 104 can compare the luminance of the pixel of the captured irradiated spot with the luminance of the corresponding pixel of the image of the presentation. If the controller 104 determines that luminance of the pixel of the captured irradiated spot is greater than the luminance of the corresponding pixel of the image of the presentation, a determination may be made that the analyzed pixel corresponds to the pixel upon which the light of the pointer is irradiated. Consequently, coordinates of the irradiated spot/pixels may be determined.

As used herein, the phrase "image of the presentation" refers to the image as it exists before it is projected. As noted above, the image of the presentation may be retrieved from an internal memory (e.g., 105) or received from an input module 107. The retrieved image is the projected onto the screen. The "image of the presentation" is thus the image which is projected by the apparatus via the projector 103 onto the screen.

Likewise, as used herein, the term "captured image" refers to the image which is captured by the apparatus 100 after is it projected. In other words, the "captured image" is the image (after being projected onto the screen) which is input into the apparatus 100 via the camera 101.

It is possible that the luminance of the captured image may differ from the luminance of the image of the presentation. That is, a pixel or pixels of the captured image may differ from (e.g., be brighter than) the corresponding pixel or pixels of the image of the presentation regardless of the presence of the light of the pointer irradiated onto the screen. In such a case, a determination may be falsely made that the analyzed pixel corresponds to a pixel upon which the light of the pointer is irradiated. In order to avoid this sort of potential false determination, the controller 104 can operate so as to determine not only whether the luminance of the pixel of the captured irradiated spot is greater than the luminance of the corresponding pixel of the image of the presentation, but also determine whether the luminance of the pixel of the captured irradiated spot is greater than a predetermined threshold value.

Figure 2:
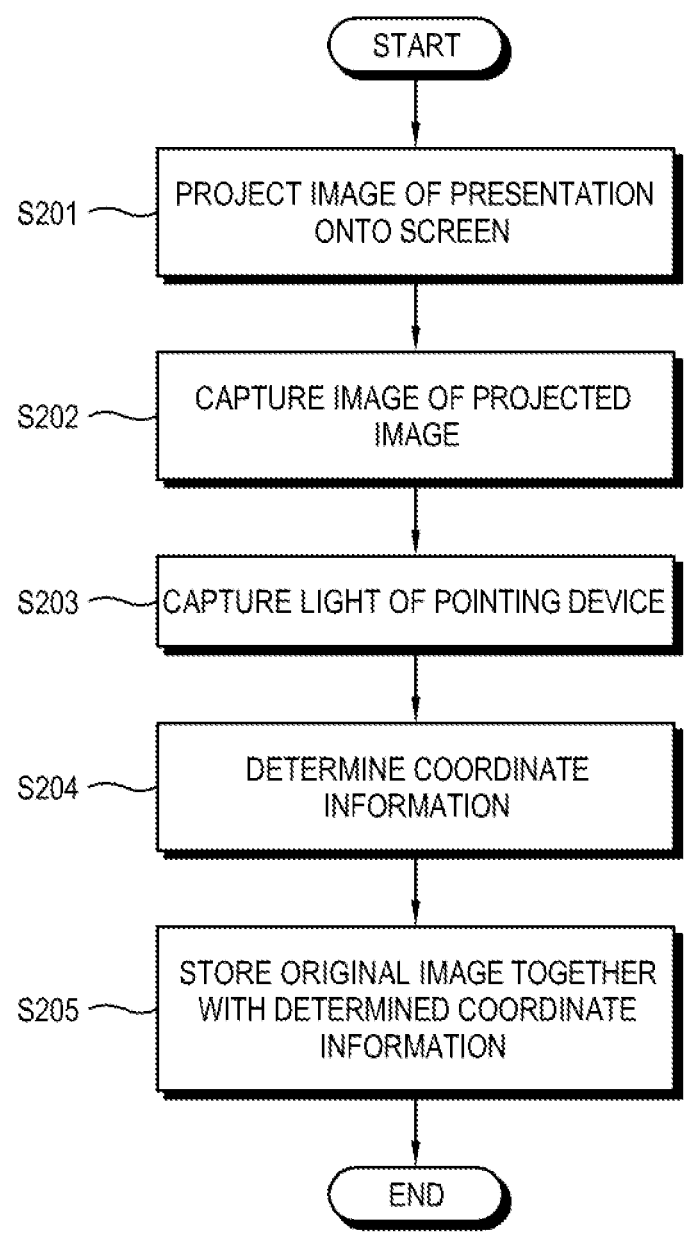
FIG. 2 illustrates an example of an operation of an apparatus according to an exemplary embodiment of the present invention.

FIG. 2 illustrates an operation of an apparatus according to an exemplary embodiment of the present invention. First, the presentation is projected onto the screen by the projector (S201). The projected image is then captured by the camera (S202). The camera also captures the light of the pointing device as it is irradiated onto the screen (S203). Once the image of the projected presentation and the irradiated light of the pointing device have been captured, the controller can determine coordinate information corresponding to the location of the irradiated spot as it appears on the screen (S204). Once the coordinates are determined, they can be stored with the original image data (S205).

As noted above, the luminance of the captured image (i.e., the output image) can be compared to the luminance of the image of the presentation (i.e., the input image). Again, as noted above, the luminance of the spot where the laser is irradiated upon would tend to have a higher luminance than the corresponding spot on the original image. The determination can be applied to the entire image (i.e., all of the pixels within the image) so as to determine all points of the projected image which should be regarded as coordinates of the irradiated light. The determined coordinates can be stored together with the original image data in one place (e.g., a multimedia file) or separately in separate files or memory locations. As used herein, the phrase "stored together" means that the stored items are stored jointly in the same location, such as in a single file. One of skill in the art would readily understand that it is not necessary to store the stored items simultaneously (i.e., at the same time) in order to store said items together.

Figure 3:
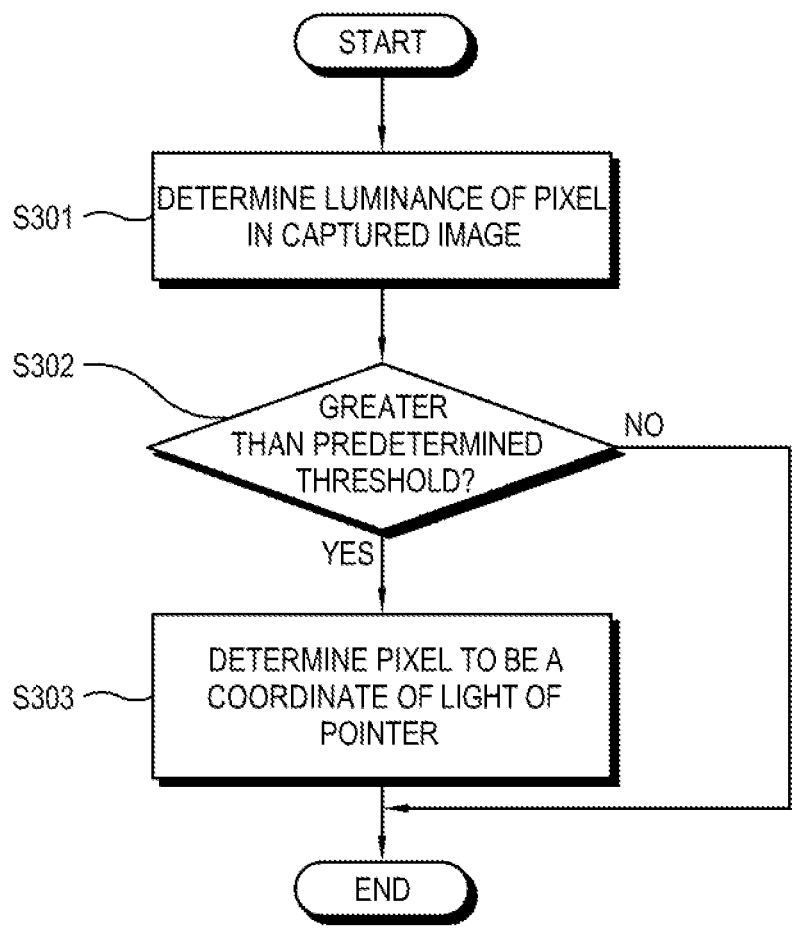
FIG. 3 illustrates an example of an operation of an apparatus according to an exemplary embodiment of the present invention.

FIG. 3 shows an operation of determining the coordinates of the irradiated spot according to an exemplary embodiment of the present invention. In S301, the luminance of a pixel in the captured image is determined. Next, the luminance of the pixel in the captured image can be compared to a predetermined threshold value (S302). This value may be set based on a determined luminance of the particular pointing device employed. For example, a laser pointer may typically irradiate a light having a certain luminance onto the screen. Once a typical value is known, the threshold value can be set so as to rule out false determinations. If the luminance of the pixel in the captured image is greater than the predetermined threshold value (S302-Y) the determination is made that the pixel in question is a pixel which corresponds to a coordinate of the light of the pointer which is irradiated onto the screen (S303).

Figure 4:
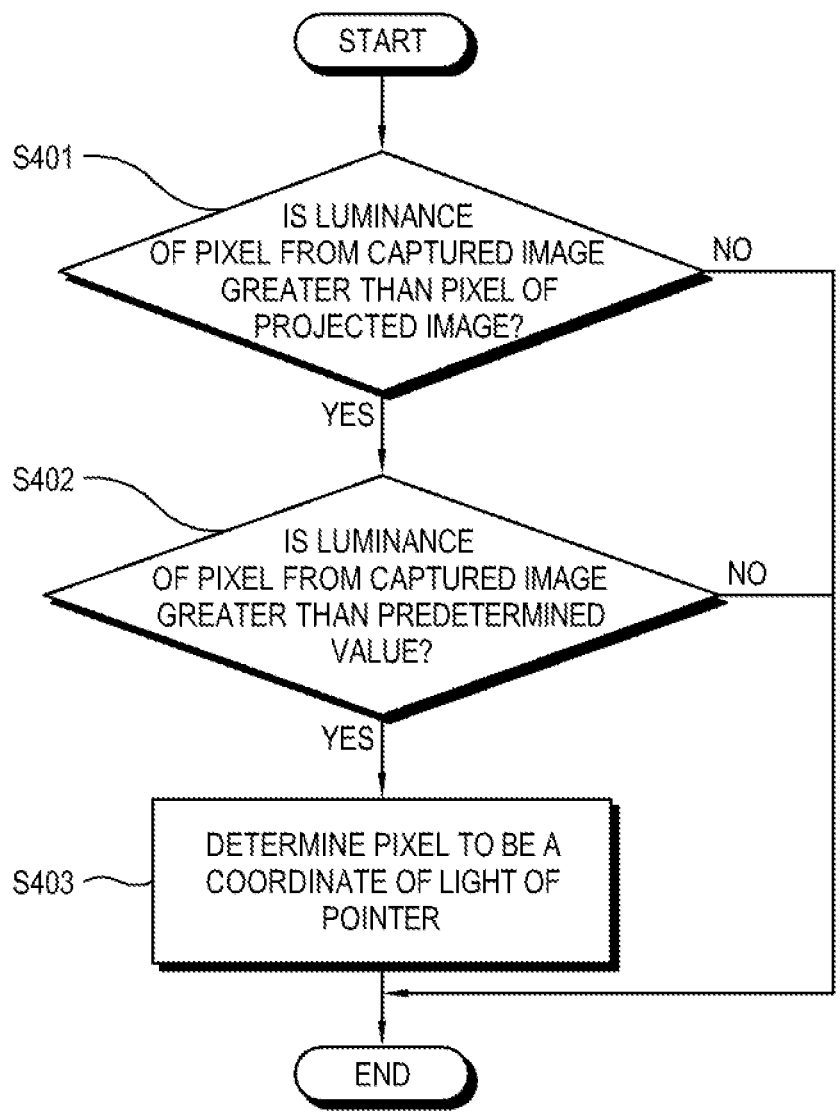
FIG. 4 illustrates an example of an operation of an apparatus according to an exemplary embodiment of the present invention.

FIG. 4 shows a similar operation according to an exemplary embodiment of the present invention. In this case, the luminance of the pixel in the captured image is first compared to the luminance of a corresponding pixel of the projected image (S401). If the luminance of the pixel in the captured image is greater than the luminance of the corresponding pixel of the projected image (S401-Y), the luminance can then be compared to the predetermined threshold value (S402) (note, that this step is optional). If the luminance of the pixel in the captured image is greater than the predetermined threshold value (S402-Y) the determination is made that the pixel in question is a pixel which corresponds to a coordinate of the light of the pointer which is irradiated onto the screen (S403).

Figure 5:
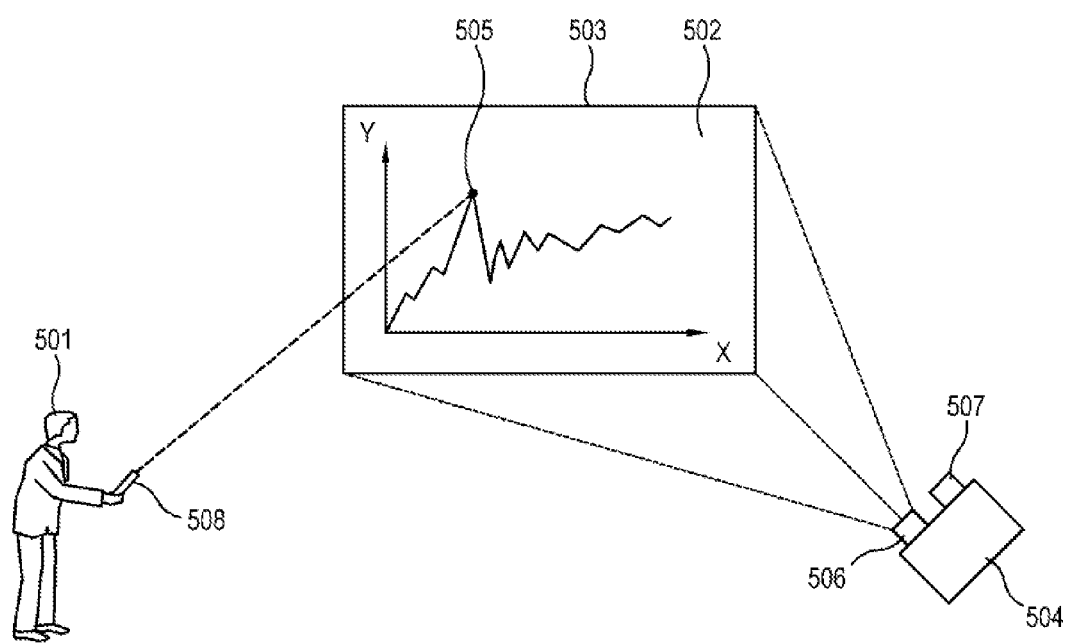
FIG. 5 illustrates an example of an operation according to exemplary embodiment of the present invention.

FIG. 5 illustrates an operation according to an exemplary embodiment of the present invention. As shown in FIG. 5, a user 501 presents a presentation 502 which is projected onto a screen 503 by an apparatus 504. The user 501 uses a pointing device 508 to irradiate a spot 505 onto the screen 503. The apparatus 504 includes a projector 506 and a camera 507. The projector 506 projects an image of the presentation onto the screen 503. The camera 507 then captures the image of the presentation 502 which is projected onto the screen 503 as well as the irradiated spot 505.

As noted above, the apparatus 504 may further include an audio recorder 102 as shown in FIG. 1. The audio recorder 102 may include an internal microphone or an input from an external microphone. Any sort of microphone capable of capturing an audio signal should suffice. Further, the audio signal can come from any number of different sources, e.g., a speaker's voice, music, sound effects, etc. Also, many different processing techniques (e.g., echo canceling, feedback prevention, etc.) may be utilized by the apparatus 504 to improve the quality of both the capturing and the reproducibility of the audio recording.

It is also possible to use a directional microphone and/or directional microphone processing techniques (e.g., beamforming) in order to determine a direction of the speaker. For example, several speakers may participate in the presenting of the presentation, and each one may utilize a pointing device. In such a case, it may be desirable to pinpoint the direction of the speaker currently speaking so as to maximize the quality of the captured audio signal.

Once captured, the audio signal can be stored along with the original image of the presentation and the determined coordinates corresponding to the position of the light of the pointing device irradiated onto the screen. As noted above with respect to the determined coordinates, the captured audio can be stored together with the original image data in one place (e.g., a multimedia file) or separately in separate files or memory locations.

Figure 6:
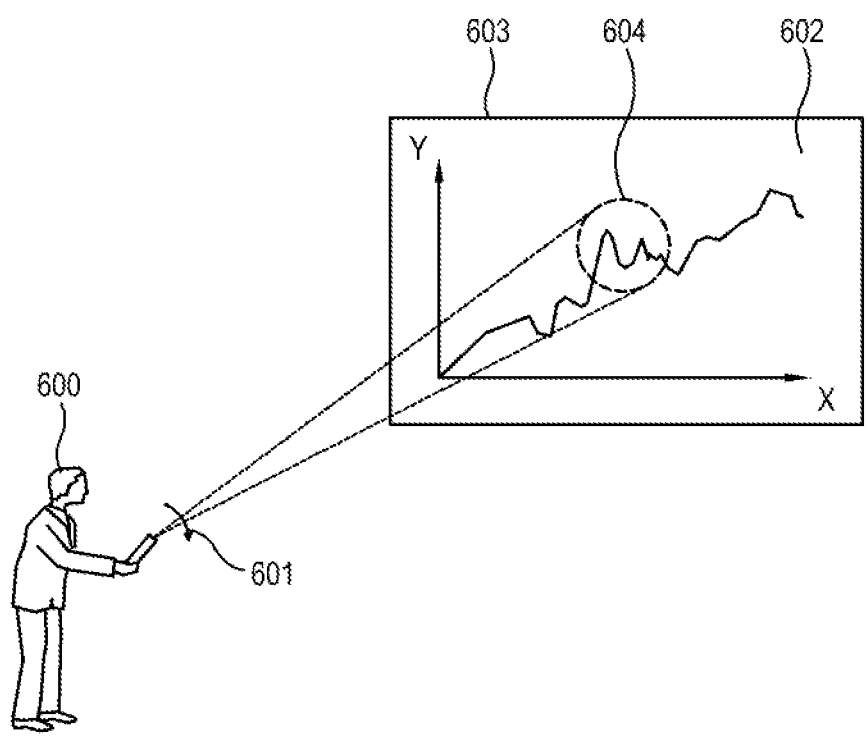
FIG. 6 illustrates an example of an operation according to exemplary embodiment of the present invention.

FIG. 6 shows another exemplary embodiment of the present invention, whereby a user uses a pointing device to draw shapes on the screen during the presentation. For example, a speaker 600 may wish to highlight a particular point on an image of a presentation 602 by drawing a circle 604 (or other shape) around an object on the screen 603. That is, the speaker 600 could use move her hand (while pointing the pointing device at the screen) in a circular pattern 601, effectively drawing a circle 604 on the screen 603 with the light of the pointing device irradiated onto the screen 603. While FIG. 6 shows a circle 604, other shapes are possible (e.g., a line, square, rectangle, etc.).

In this case, the controller 104 can analyze an accumulation of information corresponding to coordinate information for a plurality of positions of the light of the pointing device which is irradiated onto the screen 603, and determine if the plurality of positions of the light of the pointing device correspond to a shape. In order to recognize various shapes, stored shape data could be referenced and compared by the controller 104 to the accumulated information. One of skill in the art would recognize that various methods could be employed to facilitate such a determination. If the plurality of positions of the light of the pointing device correspond to a known shape, the controller 104 further can then control the memory 105 to store shape information corresponding to the shape to be stored together with the original image of the presentation, the determined coordinate information and the captured audio signal.

Figure 7:
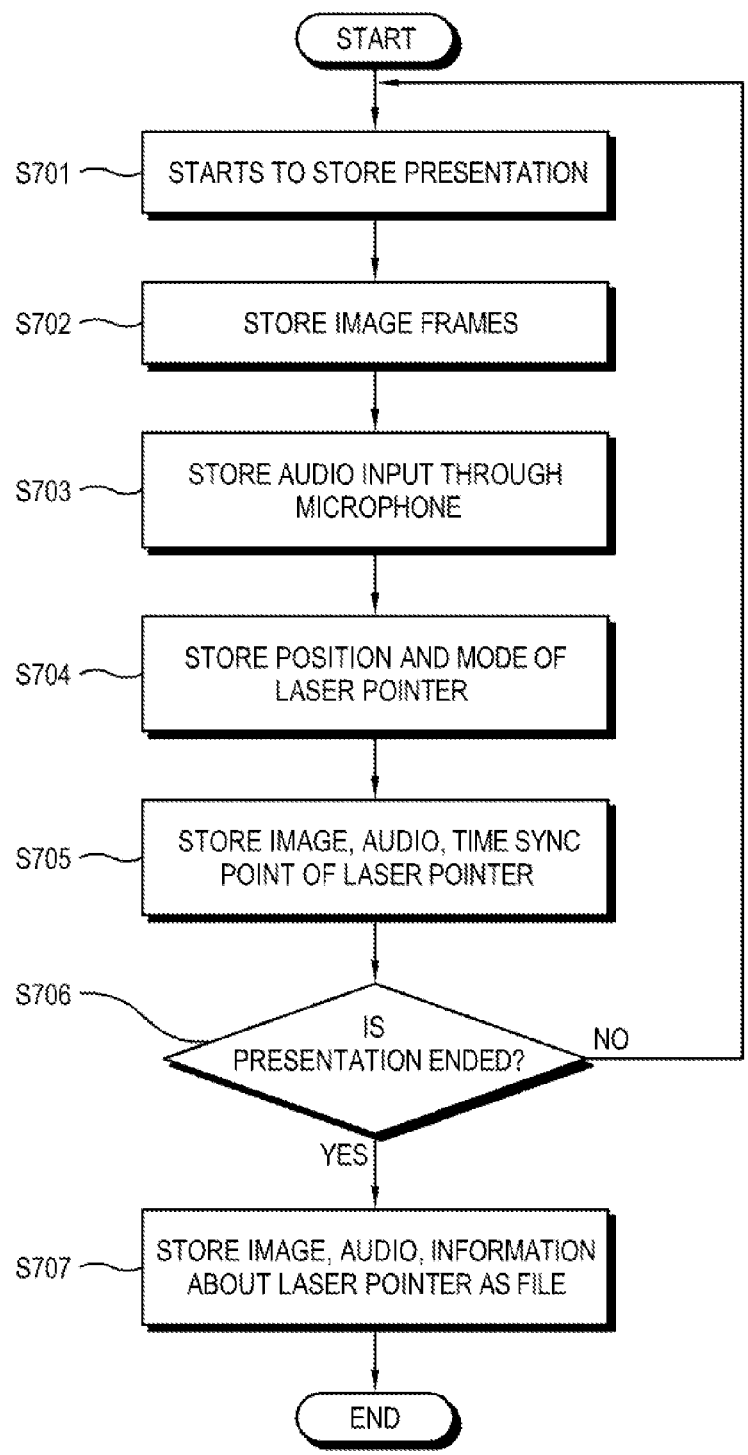
FIG. 7 illustrates an example of an operation of an apparatus according to another exemplary embodiment of the present invention.

FIG. 7 illustrates an example of an operation of an apparatus according to another exemplary embodiment of the present invention.

The apparatus starts to store a presentation (S701).

When starting to store the presentation, the apparatus stores image frames (S702).

According to an exemplary embodiment, the image frames may be an image received from an external input. According to another exemplary embodiment, the image frame may be an image received from a file viewer. The apparatus store an audio input through a microphone (S703). The apparatus stores a position and a mode of a laser pointer (S704).

The apparatus stores an image, an audio, and a time sync point of the laser pointer (S705). In this case, an image file, an audio file and a position information file of the laser pointer are all synchronized in time and stored as one file or three files, respectively.

The apparatus determines whether the presentation is ended (S706). If the presentation is ended (S706-Y), the apparatus stores an image, an audio and information about the laser pointer as a file (S707). On the other hand, if the presentation is not ended (S706-N), the apparatus returns to S701 and continues to store the presentation.

In the existing technique, it is impossible to manage and store an image marked on the way of the presentation. According to this embodiment, the image projected by the projector and the audio input through the microphone are stored, and a position pointed by the laser pointer is found out and also stored on the basis of the image input through a camera. Thus, matters pointed by a presenter using the laser pointer can be recorded and then played in sync with the stored image and audio.

Figure 8:
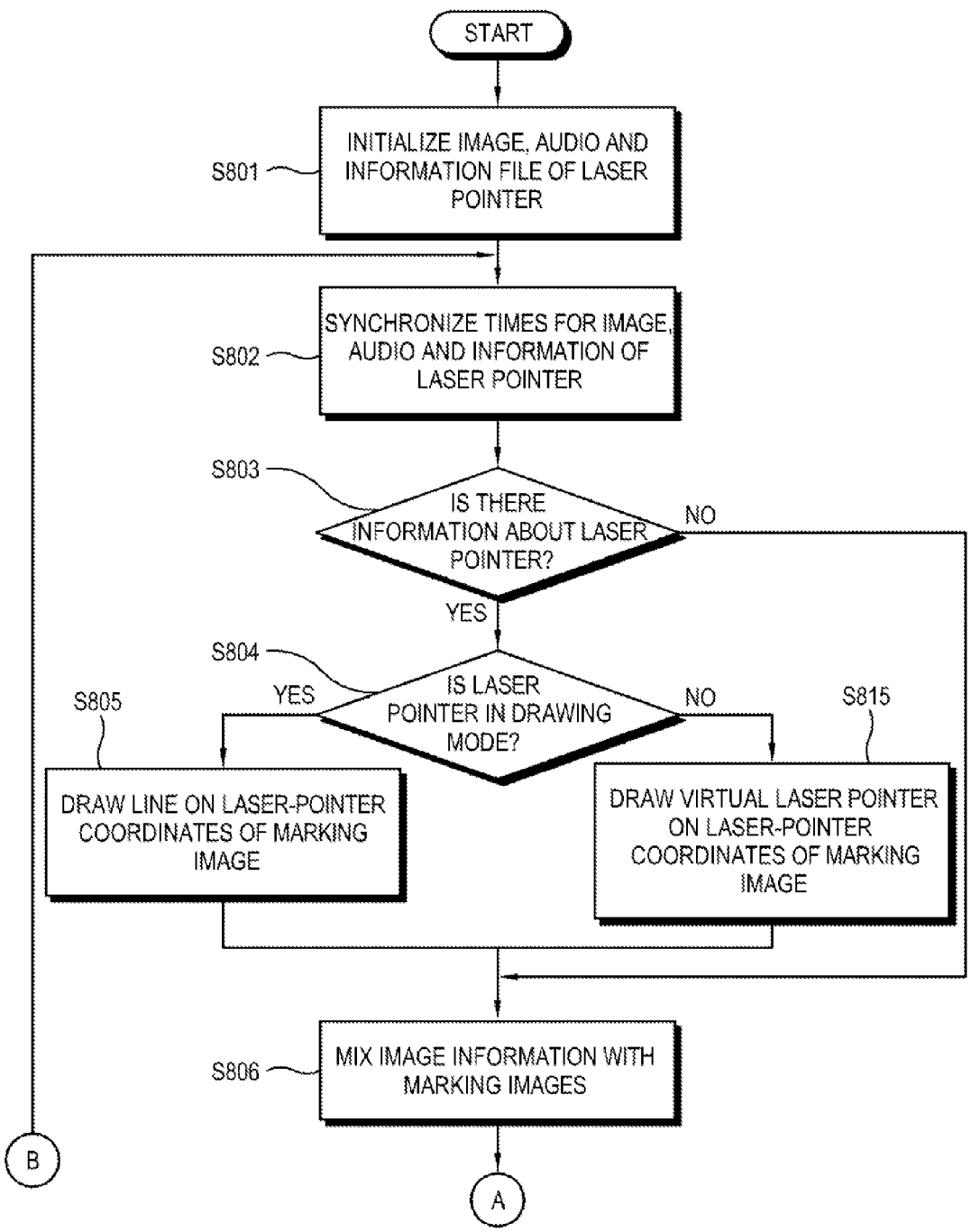
FIGS. 8 and 9 illustrate examples of operations of an apparatus according to other exemplary embodiments of the present invention.
Figure 9:
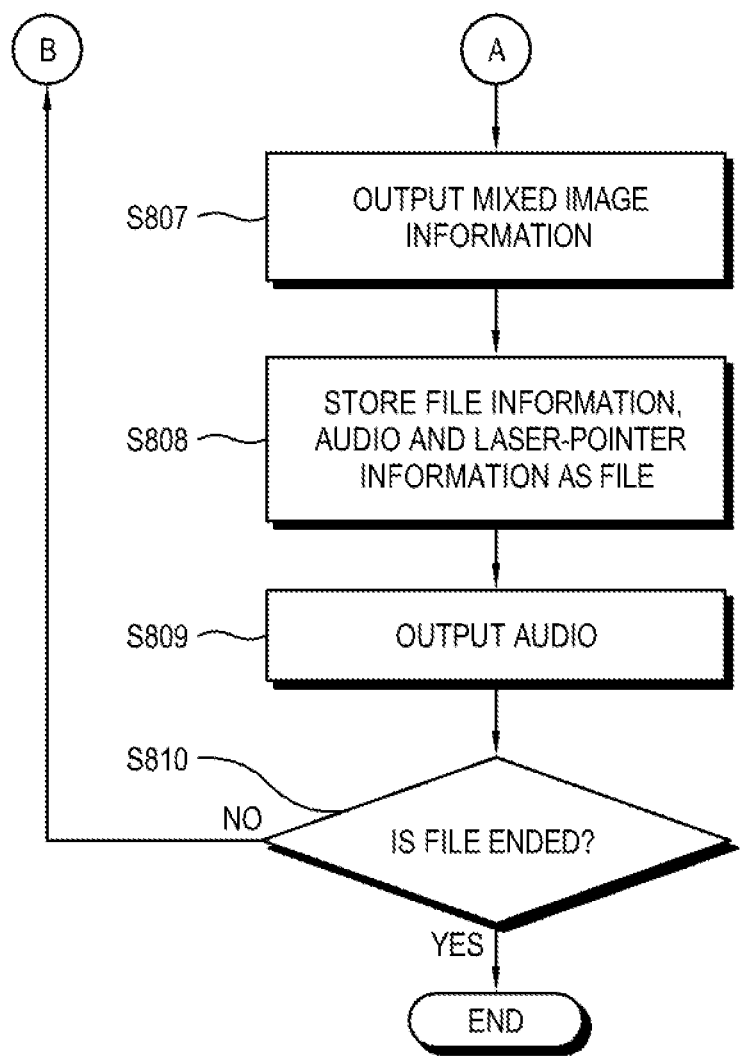

FIGS. 8 and 9 illustrate examples of operations of an apparatus according to other exemplary embodiments of the present invention.

FIGS. 8 and 9 show that a user selects a stored presentation file to be played through a projector or a personal computer (PC).

The apparatus initializes an image, an audio and an information file of a laser pointer (S801).

The apparatus synchronizes playing times for the image, the audio and the information of the laser pointer (S802).

The apparatus determines whether there is information about the laser pointer (S803). That is, the apparatus ascertains whether the laser pointer is detected at a currently played time. If there is no information about the laser pointer (S803-N), the apparatus implements S806. If there is the information about the laser pointer (S803-Y), the apparatus determines whether the laser pointer is under a drawing mode (S804). Specifically, when the laser pointer is detected, it is determined whether the laser pointer is in the drawing mode or a mode for just pointing out a certain position on a screen.

In this case, if the laser pointer is in the drawing mode (S804-Y), the apparatus draws a line on laser-pointer coordinates of a marking image (S805). For example, in the drawing mode, it is possible to draw a picture on the marking image.

On the other hand, if the laser pointer is not in the drawing mode (S804-N), e.g., if the laser pointer is in a pointing mode, the apparatus draws a virtual laser pointer on the laser-pointer coordinates of the marking image (S815). For example, like a virtual laser pointer, similarities to an actual laser pointer may be marked on the marking image.

The apparatus mixes image information with the marking images (S806), and outputs mixed image information (S807).

The apparatus stores file information, audio and laser-pointer information as a file (S808).

The apparatus outputs the audio (S809).

In this case, the apparatus determine whether the file is ended (S810). If the file is not ended (S810-N), the apparatus implements S802.

As described above, an image projected by a projector and an audio input through a microphone are stored in the projector, and a position pointed by a laser pointer is recognized and stored on the basis of an image input through a camera, so that matters pointed by a presenter using the later pointer can be recorded and then played in sync with the stored image and audio.

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A presentation recording apparatus comprising: a projector operable to project an original image of a presentation onto a screen;
    a camera operable to capture the image of the presentation projected onto the screen and a light of a pointing device which is irradiated onto the screen;
    a memory; and
    a controller, wherein if the projector projects the image of the presentation onto the screen, the controller controls the camera to capture the image of the presentation projected onto the screen, determines coordinate information corresponding to a position of the light of the pointing device irradiated onto the screen, and controls the memory to store the original image of the presentation together with the determined coordinate information,
    wherein the original image of the presentation and the determined coordinate information are stored together in the memory in a multimedia file.

2. The presentation recording apparatus of claim 1, wherein the pointing device is a laser pointer.

3. The presentation recording apparatus of claim 1, further comprising an audio recorder which is operable to capture an audio signal received during the projecting of the image of the presentation onto the screen, wherein if the projector projects the image of the presentation onto the screen, the controller further controls the audio recorder to capture the audio signal and controls the memory to save the captured audio signal together with the image of the presentation and the determined coordinate information.

4. The presentation recording apparatus of claim 3, wherein the audio signal is a voice of a speaker speaking during the presentation.

5. The presentation recording apparatus of claim 1, wherein the determining of the coordinate information includes determining horizontal and vertical coordinates of the light of the pointing device irradiated onto the screen.

6. The presentation recording apparatus of claim 1, wherein the determining of the coordinate information includes comparing pixels of the captured image with pixels of the image of the presentation.

7. The presentation recording apparatus of claim 1, wherein the determining of the coordinate information includes determining whether a pixel of the captured image has a luminance greater than a predetermined threshold value.

8. The presentation recording apparatus of claim 1, wherein the controller further analyzes an accumulation of information corresponding to coordinate information for a plurality of positions of the light of the pointing device which is irradiated onto the screen, and determines if the plurality of positions of the light of the pointing device correspond to a shape, and if the plurality of positions of the light of the pointing device correspond to the shape, the controller further controls the memory to store shape information corresponding to the shape to be stored together with the original image of the presentation and the determined coordinate information.

9. The presentation recording apparatus of claim 1, wherein the determining of the coordinate information includes comparing pixels of the captured image with pixels of an original image of the presentation which is received by the apparatus.

10. A method for recording a presentation, the method comprising:
  projecting an original image of a presentation onto a screen;
  capturing the image of the presentation projected onto the screen;
  capturing a light of a pointing device which is irradiated onto the screen;
  determining coordinate information corresponding to a position of the light of the pointing device irradiated onto the screen; and
  storing the original image of the presentation together with the determined coordinate information,
  wherein the original image of the presentation and the determined coordinate information are stored together in a multimedia file.

11. The method according to claim 10 further comprising: capturing an audio signal and saving the captured audio signal together with the captured image of the presentation and the determined coordinate information.

12. The method according to claim 10, wherein the determining of the coordinate information includes determining horizontal and vertical coordinates of the light of the pointing device irradiated onto the screen.

13. The method according to claim 10, wherein the determining of the horizontal and vertical coordinates includes comparing pixels of the captured image with pixels of the image of the presentation.

14. The method according to claim 10, wherein the determining of the coordinate information includes determining whether a pixel of the captured image has a luminance greater than a predetermined threshold value.

15. The method according to claim 10, further comprising:
  analyzing an accumulation of information corresponding to coordinate information for a plurality of positions of the light of the pointing device which is irradiated onto the screen;
  determining whether the plurality of positions of the light of the pointing device correspond to a shape; and
  if the plurality of positions of the light of the pointing device correspond to the shape, the method further comprises storing shape information corresponding to the shape to be stored together with the original image of the presentation and the determined coordinate information.

16. The method according to claim 10, wherein the determining of the coordinate information includes comparing pixels of the captured image with pixels of an original image of the presentation which is received by the apparatus.

17. The method according to claim 10, further comprising receiving the presentation from an external input.

* * * * *